(12) United States Patent
diFlora (10) Patent No.: US 10,838,378 B2
(45) Date of Patent: Nov. 17, 2020

(54) CONTROL OF A COMPUTER PROGRAM USING MEDIA CONTENT

(71) Applicant: Rovio Entertainment Ltd, Espoo (FI)

(72) Inventor: Cristiano diFlora, Espoo (FI)

(73) Assignee: ROVIO ENTERTAINMENT LTD, Espoo (FI)

( * ) Notice: Subject to any disclaimer, the term of this patent is extended or adjusted under 35 U.S.C. 154(b) by 678 days.

(21) Appl. No.: 14/292,953

(22) Filed: Jun. 2, 2014

(65) Prior Publication Data

US 2015/0346700 A1 Dec. 3, 2015

(51) Int. Cl.
| | |
|---|---|
| *G05B 15/02* | (2006.01) |
| *H04W 12/04* | (2009.01) |
| *H04W 12/06* | (2009.01) |
| *H04L 29/06* | (2006.01) |
| *H04L 29/08* | (2006.01) |

(52) U.S. Cl.
CPC .............. *G05B 15/02* (2013.01); *H04L 63/08* (2013.01); *H04L 67/141* (2013.01); *H04W 12/04* (2013.01); *H04W 12/06* (2013.01)

(58) Field of Classification Search
None
See application file for complete search history.

(56) References Cited

U.S. PATENT DOCUMENTS

| | | | | | |
|---|---|---|---|---|---|
| 5,535,130 A | * | 7/1996 | Long | .................. | G06Q 50/06 700/231 |
| 5,793,980 A | * | 8/1998 | Glaser | .................. | H04H 20/28 370/352 |
| 5,862,260 A | * | 1/1999 | Rhoads | ................... | G06F 21/10 382/232 |
| 5,892,900 A | * | 4/1999 | Ginter | .................... | G06F 21/10 726/26 |
| 5,910,987 A | * | 6/1999 | Ginter | .................... | G06F 21/10 348/E5.006 |
| 6,101,038 A | * | 8/2000 | Hebert | ................ | G02B 27/017 345/30 |
| 6,122,403 A | * | 9/2000 | Rhoads | .................. | G06F 21/10 382/233 |
| 6,167,253 A | * | 12/2000 | Farris | .................... | H04M 11/08 455/412.2 |

(Continued)

FOREIGN PATENT DOCUMENTS

EP 2 575 128 A2 4/2013

OTHER PUBLICATIONS

"Main/Unlockable Content—Television Tropes & Idioms", Oct. 30, 2013, http://web.archive.org/web/20131030173809/http://tvtropes.org/pmwiki/pmwiki.php/Main/UnlockableContent [retrieved on Nov. 4, 2014].

(Continued)

*Primary Examiner* — Mohammad Ali
*Assistant Examiner* — Kelvin Booker
(74) *Attorney, Agent, or Firm* — Squire Patton Boggs (US) LLP (57) ABSTRACT

According to an example embodiment of the present invention, there is provided an apparatus configured at least to receive control information embedded in an audio content signal, determine the control information conforms to a criterion defined by the computer program, and modify execution of the computer program at least in part in dependence of the determination.

17 Claims, 6 Drawing Sheets

(56) References Cited

U.S. PATENT DOCUMENTS

| | | | | |
|---|---|---|---|---|
| 6,381,341 B1* | 4/2002 | Rhoads | ............ | G06K 9/00442 382/100 |
| 6,411,725 B1* | 6/2002 | Rhoads | ............ | G06F 21/10 382/100 |
| 6,948,070 B1* | 9/2005 | Ginter | ............ | G06F 21/10 348/E5.006 |
| 6,961,858 B2* | 11/2005 | Fransdonk | ............ | G06F 21/10 380/281 |
| 6,993,137 B2* | 1/2006 | Fransdonk | ............ | G06F 21/10 380/259 |
| 7,020,285 B1* | 3/2006 | Kirovski | ............ | G10L 19/018 380/201 |
| 7,051,212 B2* | 5/2006 | Ginter | ............ | G06F 21/10 380/231 |
| 7,054,465 B2* | 5/2006 | Rhoads | ............ | G06F 17/30876 382/100 |
| 7,069,451 B1* | 6/2006 | Ginter | ............ | H04N 21/8358 348/E5.006 |
| 7,095,854 B1* | 8/2006 | Ginter | ............ | G06F 21/10 380/231 |
| 7,107,462 B2* | 9/2006 | Fransdonk | ............ | G06Q 20/12 380/282 |
| 7,124,302 B2* | 10/2006 | Ginter | ............ | G06F 21/10 380/279 |
| 7,133,845 B1* | 11/2006 | Ginter | ............ | G06F 21/10 348/E5.006 |
| 7,143,290 B1* | 11/2006 | Ginter | ............ | G06F 21/6209 348/E5.006 |
| 7,228,427 B2* | 6/2007 | Fransdonk | ............ | G06Q 20/12 705/51 |
| 7,237,255 B2* | 6/2007 | Fransdonk | ............ | G06F 21/10 705/79 |
| 7,248,717 B2* | 7/2007 | Rhoads | ............ | G06K 7/1417 382/100 |
| 7,263,497 B1* | 8/2007 | Wiser | ............ | G06Q 20/3829 705/26.8 |
| 7,349,976 B1* | 3/2008 | Glaser | ............ | H04L 65/4084 709/219 |
| 7,389,531 B2* | 6/2008 | Fransdonk | ............ | G06Q 20/027 705/79 |
| 7,404,084 B2* | 7/2008 | Fransdonk | ............ | G06Q 20/12 380/277 |
| 7,496,277 B2* | 2/2009 | Ackley | ............ | G11B 27/10 386/230 |
| 7,634,787 B1* | 12/2009 | Gebhardt | ............ | H04N 7/165 709/202 |
| 7,706,540 B2* | 4/2010 | Fransdonk | ............ | H04L 9/0825 380/259 |
| 7,813,822 B1* | 10/2010 | Hoffberg | ............ | G06K 9/00369 381/73.1 |
| 7,991,697 B2* | 8/2011 | Fransdonk | ............ | G06Q 30/06 380/201 |
| 8,112,711 B2* | 2/2012 | Ackley | ............ | G11B 19/025 715/716 |
| 8,254,308 B1 | 8/2012 | Gailloux et al. | | |
| 8,307,212 B2* | 11/2012 | Van Wie | ............ | G06F 21/10 713/176 |
| 8,316,237 B1* | 11/2012 | Felsher | ............ | H04L 9/0825 380/282 |
| 8,321,679 B2* | 11/2012 | Petrovic | ............ | G06F 21/10 382/232 |
| 8,376,846 B1* | 2/2013 | DiMichele | ............ | G07F 17/323 463/16 |
| 8,451,086 B2* | 5/2013 | Petrovic | ............ | G10L 19/018 340/12.5 |
| 8,489,403 B1* | 7/2013 | Griffin | ............ | G10L 19/008 375/260 |
| 8,516,533 B2 | 8/2013 | Davis et al. | | |
| 8,639,625 B1* | 1/2014 | Ginter | ............ | G06F 21/10 705/50 |
| 8,935,279 B2* | 1/2015 | Skeen | ............ | H04L 65/4084 707/769 |
| 8,935,796 B2* | 1/2015 | Sloo | ............ | G06F 21/10 726/26 |
| 9,041,784 B2* | 5/2015 | Rivera | ............ | G11B 27/002 348/61 |
| 9,584,325 B1* | 2/2017 | Brandwine | ............ | H04L 9/3234 |
| 2001/0019618 A1* | 9/2001 | Rhoads | ............ | G06K 7/1417 382/100 |
| 2002/0012443 A1* | 1/2002 | Rhoads | ............ | G06Q 30/02 382/100 |
| 2002/0048369 A1* | 4/2002 | Ginter | ............ | G06F 21/10 380/277 |
| 2002/0061185 A1* | 5/2002 | Hirabayashi | ............ | G11B 15/023 386/243 |
| 2002/0199001 A1* | 12/2002 | Wenocur | ............ | G06Q 10/107 709/227 |
| 2002/0199096 A1* | 12/2002 | Wenocur | ............ | G06Q 10/107 713/153 |
| 2003/0009670 A1* | 1/2003 | Rhoads | ............ | G06T 1/0021 713/176 |
| 2003/0009694 A1* | 1/2003 | Wenocur | ............ | G06Q 10/107 726/4 |
| 2003/0031341 A1* | 2/2003 | Rhoads | ............ | G06F 17/30876 382/100 |
| 2003/0041110 A1* | 2/2003 | Wenocur | ............ | G06Q 10/107 709/206 |
| 2003/0048922 A1* | 3/2003 | Rhoads | ............ | G06T 1/0028 382/100 |
| 2003/0086585 A1* | 5/2003 | Rhoads | ............ | G06K 7/1417 382/100 |
| 2003/0091189 A1* | 5/2003 | Rhoads | ............ | H04K 1/02 380/252 |
| 2003/0102660 A1* | 6/2003 | Rhoads | ............ | G06T 1/0064 283/72 |
| 2003/0103645 A1* | 6/2003 | Levy | ............ | G11B 20/00884 382/100 |
| 2003/0172381 A1* | 9/2003 | Janevski | ............ | H04N 7/163 725/46 |
| 2003/0191719 A1* | 10/2003 | Ginter | ............ | G06F 21/10 705/54 |
| 2004/0022444 A1* | 2/2004 | Rhoads | ............ | G06K 9/00577 382/232 |
| 2004/0054630 A1* | 3/2004 | Ginter | ............ | G06F 21/10 705/53 |
| 2004/0057581 A1* | 3/2004 | Rhoads | ............ | H04N 1/32144 380/59 |
| 2004/0133793 A1* | 7/2004 | Ginter | ............ | G06F 21/10 713/193 |
| 2004/0220791 A1* | 11/2004 | Lamkin | ............ | G06F 21/10 703/11 |
| 2004/0220926 A1* | 11/2004 | Lamkin | ............ | G06F 21/10 |
| 2004/0230997 A1* | 11/2004 | Kaylani | ............ | H04N 21/426 725/111 |
| 2004/0237100 A1* | 11/2004 | Pinder | ............ | H04N 7/162 725/31 |
| 2005/0104802 A1* | 5/2005 | Hebert | ............ | H04N 7/18 345/7 |
| 2005/0177716 A1* | 8/2005 | Ginter | ............ | G06F 21/10 713/157 |
| 2005/0195975 A1* | 9/2005 | Kawakita | ............ | H04L 9/0822 380/30 |
| 2005/0196013 A1* | 9/2005 | Rhoads | ............ | G06F 17/30876 382/100 |
| 2006/0007358 A1* | 1/2006 | Kim | ............ | H04N 5/44513 348/553 |
| 2006/0010500 A1* | 1/2006 | Elazar | ............ | G06F 21/10 726/27 |
| 2006/0013435 A1* | 1/2006 | Rhoads | ............ | G06T 1/005 382/100 |
| 2006/0068907 A1* | 3/2006 | DiMichele | ............ | A63F 13/12 463/30 |
| 2006/0150251 A1* | 7/2006 | Takashima | ............ | H04L 9/0869 726/26 |
| 2006/0188128 A1* | 8/2006 | Rhoads | ............ | G06K 7/1417 382/100 |
| 2007/0021058 A1 | 1/2007 | Arseneau et al. | | |

(56) References Cited

U.S. PATENT DOCUMENTS

| | | | |
|---|---|---|---|
| 2007/0033419 A1* | 2/2007 | Kocher | G06F 21/10 713/193 |
| 2007/0100701 A1* | 5/2007 | Boccon-Gibod | H04L 63/0492 705/21 |
| 2007/0124602 A1* | 5/2007 | Wald | G06F 21/10 713/193 |
| 2007/0130585 A1* | 6/2007 | Perret | H04N 7/17318 725/46 |
| 2007/0168262 A1* | 7/2007 | Morotomi | G06Q 30/0601 705/26.1 |
| 2007/0168425 A1* | 7/2007 | Morotomi | H04M 1/72522 709/204 |
| 2007/0169147 A1* | 7/2007 | Kii | G11B 27/11 725/38 |
| 2007/0188519 A1* | 8/2007 | Kii | G06F 1/1624 345/619 |
| 2007/0229518 A1* | 10/2007 | Kii | G06F 3/0481 345/520 |
| 2007/0250194 A1* | 10/2007 | Rhoads | G06Q 30/00 700/94 |
| 2007/0286451 A1* | 12/2007 | Rhoads | G06T 1/0064 382/100 |
| 2007/0291736 A1* | 12/2007 | Furlong | H04L 12/2803 370/352 |
| 2008/0066139 A1* | 3/2008 | Tsai | H04N 7/142 725/139 |
| 2008/0106513 A1* | 5/2008 | Morotomi | G06F 1/1624 345/156 |
| 2008/0133938 A1* | 6/2008 | Kocher | G11B 20/00086 713/193 |
| 2008/0262928 A1* | 10/2008 | Michaelis | G06Q 30/02 705/14.26 |
| 2009/0070229 A1* | 3/2009 | Ansari | G06Q 30/0601 705/26.1 |
| 2009/0109980 A1* | 4/2009 | Zuili | H04N 21/47211 370/400 |
| 2009/0125607 A1* | 5/2009 | Rhoads | G06K 9/00442 709/217 |
| 2009/0158443 A1* | 6/2009 | Dias | G06F 21/10 726/32 |
| 2009/0233705 A1* | 9/2009 | LeMay | G07F 17/32 463/25 |
| 2010/0049989 A1* | 2/2010 | Lee | G06F 21/105 713/189 |
| 2010/0231790 A1* | 9/2010 | Ansari | G06Q 30/04 348/552 |
| 2010/0261513 A1* | 10/2010 | Izen | G10H 3/146 463/7 |
| 2011/0258121 A1* | 10/2011 | Kauniskangas | G06Q 20/20 705/67 |
| 2012/0036440 A1* | 2/2012 | Dare | G06F 9/54 715/734 |
| 2012/0054508 A1* | 3/2012 | Chen | G06F 1/3293 713/300 |
| 2012/0216226 A1 | 8/2012 | Humphrey et al. | |
| 2013/0014138 A1* | 1/2013 | Bhatia | H04N 21/252 725/9 |
| 2013/0145482 A1* | 6/2013 | Ricci | G06F 9/54 726/28 |
| 2013/0152139 A1 | 6/2013 | Davis et al. | |
| 2013/0204466 A1* | 8/2013 | Ricci | G06F 17/00 701/2 |
| 2013/0205412 A1* | 8/2013 | Ricci | G06F 3/0484 726/29 |
| 2013/0212671 A1* | 8/2013 | Wang | G06F 21/70 726/16 |
| 2013/0254340 A1* | 9/2013 | Lang | H04N 21/4394 709/218 |
| 2013/0340003 A1 | 12/2013 | Davis et al. | |
| 2014/0004934 A1 | 1/2014 | Peterson et al. | |
| 2014/0088975 A1* | 3/2014 | Davis | H04W 12/02 704/500 |
| 2014/0143839 A1* | 5/2014 | Ricci | H04W 12/06 726/4 |
| 2014/0244429 A1* | 8/2014 | Clayton | G06Q 30/0631 705/26.7 |
| 2014/0244447 A1* | 8/2014 | Kim | G06Q 30/0254 705/27.2 |
| 2014/0244488 A1* | 8/2014 | Kim | G06Q 20/123 705/39 |
| 2014/0259074 A1* | 9/2014 | Ansari | H04N 21/482 725/50 |
| 2015/0004935 A1* | 1/2015 | Fu | H04W 12/08 455/411 |
| 2015/0070153 A1* | 3/2015 | Bhatia | G06F 3/016 340/407.1 |
| 2015/0106887 A1* | 4/2015 | Aslund | H04L 63/0492 726/5 |
| 2015/0286394 A1* | 10/2015 | Koval | H04L 67/06 713/156 |
| 2015/0296237 A1* | 10/2015 | Numano | G06Q 20/085 725/5 |
| 2015/0325115 A1* | 11/2015 | Wardle | G08C 23/02 367/197 |
| 2015/0325116 A1* | 11/2015 | Umminger, III | G08C 17/00 367/197 |
| 2015/0346700 A1* | 12/2015 | diFlora | G05B 15/02 700/86 |
| 2016/0087933 A1* | 3/2016 | Johnson | H04W 4/70 709/245 |
| 2016/0185222 A1* | 6/2016 | Ricci | G08C 19/00 709/213 |
| 2017/0063566 A1* | 3/2017 | Seminario | H04L 12/2816 |
| 2017/0068953 A1* | 3/2017 | Kim | G06Q 20/382 |
| 2017/0272316 A1* | 9/2017 | Johnson | G06Q 10/103 |

OTHER PUBLICATIONS

European Office Action issued in corresponding European Patent Application No. 14 170 765.3-1207 dated Apr. 18, 2019.

* cited by examiner

CONTROL OF A COMPUTER PROGRAM USING MEDIA CONTENT

FIELD OF INVENTION

The present invention pertains to the field of controlling computer program execution.

BACKGROUND OF INVENTION

Media content may be used in various ways. When jogging, a consumer may listen to music from a portable radio or media player. When at home or in a transportation vehicle, a consumer may watch video content played on a screen and in a cinema, consumers may see movies in exchange for an entrance fee. When at work, a supervisor may listen to music while overseeing an industrial process.

Content, such as for example media, may be used on mobile devices as well. Such mobiles may comprise tablets or smartphones, for example. Content may be streamed or pre-loaded into mobile devices for consumption on the go. Pre-loaded content is useful for consumption where connectivity is limited, such as for example on board aircraft. Pre-loaded or streamed content may be subject to a charge when such content is the subject of copyrights.

Mobile or non-mobile devices may run software engineered to control industrial processes, such as for example chemical plants, nuclear power stations or manufacturing facilities. For example, such software may control industrial robots to assemble cars from parts, wherein each car may be advanced along a manufacturing line such that a car assembly process may be implemented stage by stage in order.

Controlling the execution of software may be accomplished in various ways. For example, a user interface may be provided to enable a user to cause the software to be executed in a way that is suitable for the prevailing situation. User interfaces may comprise buttons, touch-screen interfaces, voice commands, keyboards and computer mice used to input instructions to a computer running the software.

Software execution may be at least in part controlled remotely. Software may be associated with licenses, such that the software may only be usable when a license to the software is in existence and valid. The software may be configured to verify the validity of a license in connection with starting up the software.

Another way to affect software remotely is provision of updates to the software. Updating may involve, for example, providing updated virus definitions to an antivirus software, or providing a new version of a web browser

SUMMARY OF THE INVENTION

According to a first aspect of the present invention, there is provided an apparatus comprising at least one processing core, at least one memory including a computer program, the at least one memory and the computer program code being configured to, with the at least one processing core, cause the apparatus at least to receive control information embedded in an audio content signal, determine the control information conforms to a criterion defined by the computer program, and modify execution of the computer program at least in part in dependence of the determination.

Various embodiments of the first aspect may comprise at least one feature from the following bulleted list:
  the control information does not identify a media content item the audio content signal is comprised in
  the at least one memory and the computer program being are configured to, with the at least one processing core, cause the apparatus to modify the execution of the computer program by modifying a set of available functionalities in the computer program
  modifying the set of available functionalities in the computer program comprises at least one of adding and removing menu options from a user interface of the computer program
  modifying the set of available functionalities in the computer program comprises at least one of enabling and disabling aspects of the computer program
  the computer program comprises a game and modifying the set of available functionalities in the computer program comprises at least one of allowing access to a bonus level, allowing use of a bonus item, recharging a player entity in the game and allowing use of a bonus vehicle
  determining the control information conforms to a criterion defined by the computer program comprises determining the control information comprises at least one of an identifier of the computer program, an identifier of a manufacturer of the computer program, an identifier of a type of the computer program and an identifier associated with a set of computer programs, the computer program being comprised in the set of computer programs
  determining the control information conforms to a criterion defined by the computer program comprises verifying the control information comprises a valid cryptographic token
  the cryptographic token comprises a cryptographic signature.

According to a second aspect of the present invention, there is provided an apparatus comprising at least one processing core, at least one memory including a computer program, the at least one memory and the computer program code being configured to, with the at least one processing core, cause the apparatus at least to retrieve, from a media storage, a media content item, and play the media content item, the media content item comprising an audio content signal which comprises embedded therein control information.

Various embodiments of the second aspect may comprise at least one feature from the following bulleted list:
  the apparatus further comprises the media storage
  the media storage comprised at least one of a magnetic memory, an optical memory, flash memory and random access memory
  the control information control information does not identify the media content item
  the control information comprises at least one of an identifier of a computer program, an identifier of a manufacturer of a computer program, an identifier of a type of a computer program and an identifier associated with a set of computer programs
  the control information comprises a valid cryptographic token
  the cryptographic token comprises a cryptographic signature.

According to a third aspect of the present invention, there is provided a method, comprising receiving control information embedded in an audio content signal, determining the control information conforms to a criterion defined by a computer program, and modifying execution of the computer program at least in part in dependence of the determination.

Various embodiments of the third aspect may comprise at least one feature corresponding to a feature comprised in the bulleted list laid out above in connection with the first aspect.

According to a fourth aspect of the present invention, there is provided a method, comprising retrieving, from a media storage, a media content item, and playing the media content item, the media content item comprising an audio content signal which comprises embedded therein control information.

Various embodiments of the fourth aspect may comprise at least one feature corresponding to a feature comprised in the bulleted list laid out above in connection with the second aspect.

According to a fifth aspect of the present invention, there is provided an apparatus comprising means for receiving control information embedded in an audio content signal, means for determining the control information conforms to a criterion defined by a computer program, and means for modifying execution of the computer program in dependence of the determination.

According to a sixth aspect of the present invention, there is provided an apparatus comprising means for retrieving, from a media storage, a media content item, and means for playing the media content item, the media content item comprising an audio content signal which comprises embedded therein control information.

According to a seventh aspect of the present invention, there is provided a non-transitory computer readable medium having stored thereon a set of computer readable instructions that, when executed by at least one processor, cause an apparatus to at least receive control information embedded in an audio content signal determine the control information conforms to a criterion defined by the computer program, and modify execution of the computer program in dependence of the determination.

According to a eighth aspect of the present invention, there is provided a non-transitory computer readable medium having stored thereon a set of computer readable instructions that, when executed by at least one processor, cause an apparatus to at least retrieve, from a media storage, a media content item, and play the media content item, the media content item comprising an audio content signal which comprises embedded therein control information.

INDUSTRIAL APPLICABILITY

At least some embodiments of the present invention find industrial application in control of industrial or other processes, for example to enhance the safety of industrial sites.

DETAILED DESCRIPTION OF EXAMPLE EMBODIMENTS

Enabling a second screen experience where content present in a background affects performance of a computer program allows controlling the execution of the computer program, at least in part, using control information that may be live or played from a recording. Benefits may include preventing user interactions with a computer program that could be dangerous. The control information may be non-specific to a content in which it is embedded, which may be beneficial at least since it removes a need to build a large database of possible contents.

Figure 1:
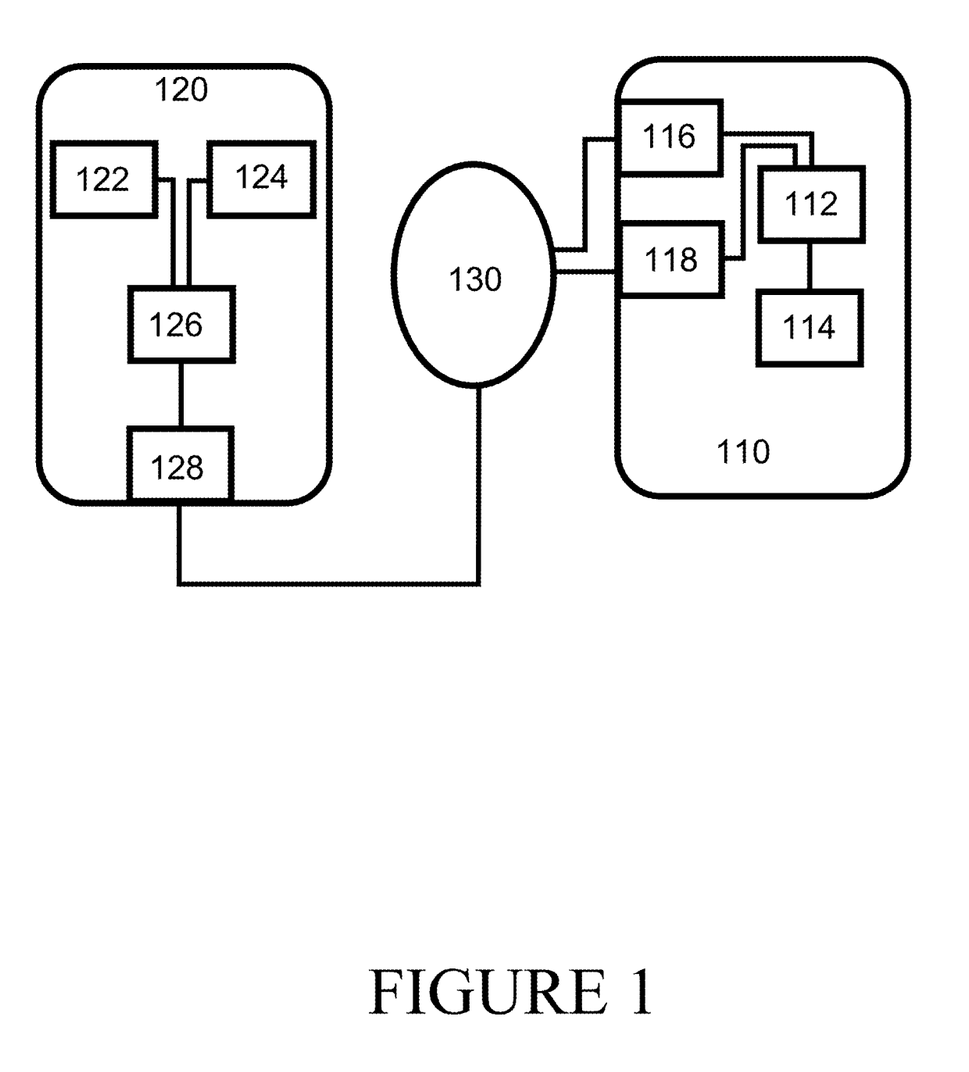
FIG. 1 illustrates a first example system capable of supporting at least some embodiments of the invention.

FIG. 1 illustrates a first example system capable of supporting at least some embodiments of the invention. FIG. 1 illustrates a user device 110, which may comprise, for example, a mobile device such as a smartphone, phablet or tablet device, or alternatively a non-mobile device such as a desktop computer or smart refrigerator. User device 110 is illustrated as comprising a microphone 116, which may operate in accordance with normal microphone principles, and a data interface 118. Data interface 118 may comprise, for example, a line-in interface, a high-definition multimedia interface, HDMI, interface, an Ethernet interface, a Bluetooth interface, an infrared interface or another type or wired or wireless interface capable of communicating data.

User device 110 is further illustrated in FIG. 1 as comprising a decoder 112, which may comprise a subliminal audio decoder, for example. Decoder 112 may be implemented as a hardware component or at least in part as a software routine configured to run on at least one processing core comprised in user device 110. Decoder 112 may be implemented in whole as the software routine. Decoder 112 may be configured to detect control information embedded in an audio content signal. Decoder 112 may be configured to, at least in part, receive the audio content signal from microphone 116 as a digital representation of an analog audio signal that microphone 116 has recorded. Decoder 112 may be configured to, at least in part, receive a data stream, for example directly or indirectly from data interface 118, and to determine presence of control information embedded in the data stream. In other words, an audio content signal may comprise a recorded digital representation of an analog audio signal, or an audio content signal may comprise an encoded digital audio content signal, received via data interface 118. The encoded digital audio content signal may be embedded in an encoded audiovisual content.

User device 110 is further illustrated in FIG. 1 as comprising a program manager 114, which may comprise, for example, a processor or a software routine configured to run on at least one processing core comprised in user device 110. In some embodiments, decoder 112 and program manager 114 are software routines configured to run on the same processing core, or at least in part on different processing cores, comprised in user device 110. Program manager 114 may be configured to modify execution of a computer program running in user device 110, for example based at least in part on control information received via microphone 116 or data interface 118.

In addition to user device 110, FIG. 1 illustrates a content provider 120. Systems configured to operate in accordance with the present invention may comprise more than one content provider and more than one user device, although for the sake of clarity only one content provider 120 and one user device 110 are illustrated in FIG. 1.

Content provider 120 may comprise a television channel, a streaming-video source, a radio channel or another content or media source. The content provider 120 of FIG. 1 comprises a content source 122, which may be arranged to produce a content signal, such as for example an audio, video or audiovisual content signal. Program asset store 124 may store information relating to controlling execution of a computer program. For example, program asset store 124 may store control information that may be inserted in a content signal, such as for example an audio content signal, to affect execution of a computer program. Program asset store 124 may store control information relating to controlling execution of more than one computer program.

Content provider 120 of FIG. 1 further comprises a program asset injector 126. Program asset injector 126 may be configured to receive a content signal from content source 122 and control information from program asset store 124. Program asset injector 126 may then modify the content signal with the control information to produce a modified content signal, wherein the modified content signal comprises embedded therein the control information in a suitable encoded format. For example, the control information may be encoded into an audio signal so that the presence of the control information in the audio signal is difficult or impossible for the human ear to detect when the audio signal is listened to. The control information may be so encoded, for example, by arranging the control information as a combination of frequency characteristics that the human ear is not adept in detecting, but which can be readily detected by numerically analysing frequency characteristics of the audio signal. The encoding may comprise error correction coding, such as for example redundancy bits.

Content provider 120 of FIG. 1 further comprises transmitter 128 configured to transmit the modified content signal, via a suitable connection, to distribution network 130. Distribution network 130 may comprise a television distribution network, a wire-line network or another kind of network.

In some embodiments, content provider 120 is an on-site system inside an industrial compound. In these cases, content source 122 may be remote and, unlike in FIG. 1, not comprised in content provider 120. In this case, the industrial compound may distribute into an on-site network a content signal received from content source 122 and modified by program asset store 124 and program asset injector 126 on the site.

In some embodiments, content provider 120 comprises a television program distribution system. In these cases, by program asset store 124 and program asset injector 126 may be used to modify a content signal to comprise control information configured to affect the execution of computer programs in consumer devices.

In general, the audio content signal, excluding the control information embedded therein, may be at least one of unrelated to the computer program, not comprised in the computer program, not caused by the computer program and independent of the computer program.

Figure 2:
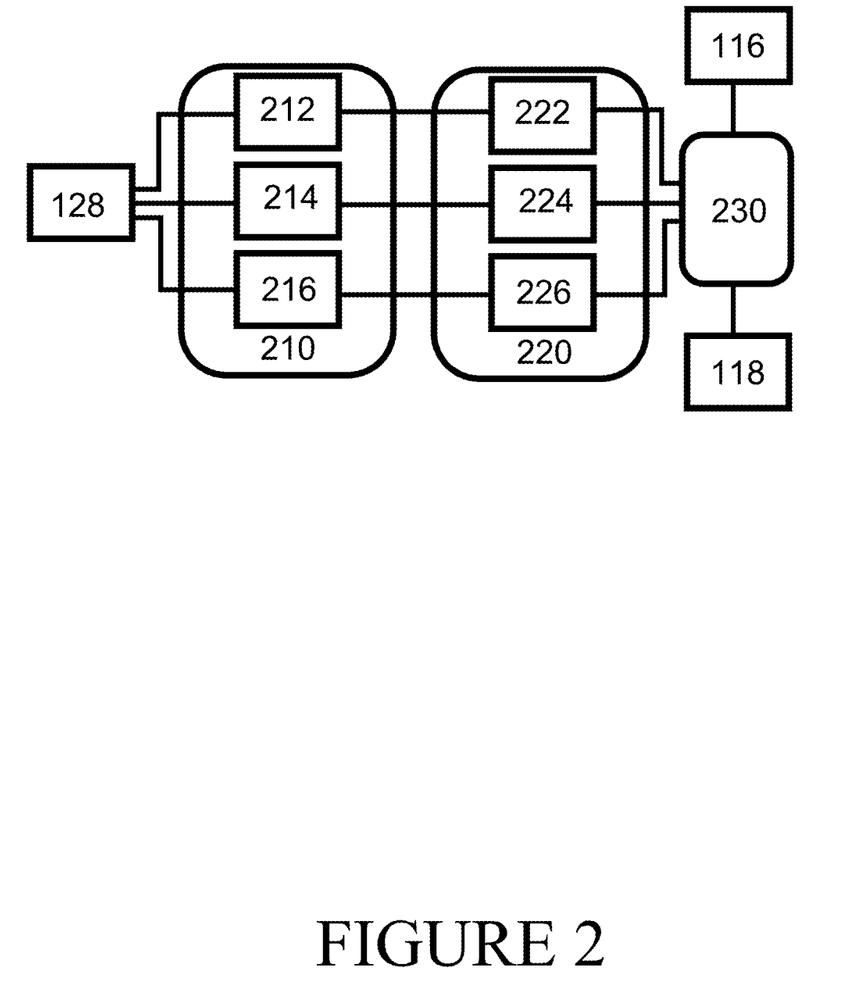
FIG. 2 illustrates a second example system capable of supporting at least some embodiments of the invention.

FIG. 2 illustrates a second example system capable of supporting at least some embodiments of the invention. Elements 116, 118 and 128 correspond to microphone 116, data interface 118 and transmitter 128, as in FIG. 1.

FIG. 2 gives further detail on some examples of what network 130 of FIG. 1 may comprise. In FIG. 2 is illustrated content delivery system 210, which may comprises pre-recorded media 212, such as digital versatile discs, DVD, or compact discs, CD. Additionally or alternatively to pre-recorded media the content delivery system may comprise video broadcasting 214. Video broadcasting may comprise at least one digital video broadcasting, DVB, stream. DVB comes in different versions such as terrestrial, satellite, cable, handheld and satellites-to-handhelds. Alternatively video broadcasting may comprise an analogue broadcast signal. Additionally or alternatively to pre-recorded media and/or video broadcasting the content delivery system may comprise data stream 216, which may comprise, for example, a hypertext transfer protocol, HTTP, stream. HTTP also comes in a secure version, HTTPS. Other streaming formats are also possible.

Additionally to content delivery system 210, in FIG. 2 there is also illustrated a user equipment 220. The user equipment may comprise at least one of a player of pre-recorded media 222, a broadcast receiver 224 and a computer 226. The player of pre-recorded media may accept pre-recorded media 212. The broadcast receiver 224 may receive video broadcasting 214. Computer 226 may receive data stream 216.

FIG. 2 also comprises a media player device 230, such as for example a television. Media player device 230 may be arranged to accept input from player of pre-recorded media 222, broadcast receiver 224 and/or computer 226. In the case of computer 226, the media player device may comprise, for example, a laptop screen and laptop speakers comprised in the computer 226 or separate from computer 226.

In at least some embodiments, only one content delivery method is needed to practice the invention. In other words, content may be delivered by pre-recorded media 212 which is played in player of pre-recorded media 222. Alternatively, content may be broadcast or streamed. Content maybe broadcast or streamed, and recorded for future playback. Thus broadcasted or streamed content may become pre-recorded content when recorded by, for example, a consumer in a set-top box. In case of pre-recorded media, transmitter 128 may be seen as a factory where pre-recorded media is produced, and the actual recordings, for example DVD discs, are then transmitted by shipping them into a distribution channel. By embedding the control information in the content, it may be achieved that the control information is synchronous to the experience of seeing and/or hearing the content, regardless of whether the content is delivered as a broadcast, stream or a recording. When broadcasting or streaming content, different receivers may receive the content at different times due to network propagation delay differences. Thus using a pre-defined timing scheme may be seen as inferior to embedding control information in the content itself.

Modifying execution of a computer program in user device 110 may be desirable for a number of reasons. For example, where user device 110 runs a control program adapted to allow a user to control aspects of a chemical process at an industrial facility, the control program may advantageously be affected to modify a user interface dynamically during execution. For example, where a chemical process is in a phase where increasing its temperature above a certain threshold would cause the process to become unstable, the control program may be caused to display a warning in case the user attempts to modify the temperature so that it would exceed the threshold. Alternatively, increasing the temperature above the threshold may be disabled for the duration of the phase where it could be dangerous. As another example, where a process step is only safe in a certain phase, it may be caused to become available in the control program during this phase and not during other phases. In general, a set of available functionalities in the computer program may be modified. In other examples, functionalities may be enabled in case the industrial process is in a stage where such functionalities are appropriate.

The execution of the computer program may be modified by introducing control information into a content broadcast or stream in the industrial facility. User device 110 may them pick up the control information, for example from an audio part of the broadcasted or streamed content, and modify the execution of the computer program accordingly. Where the content is recorded, the recorded content may comprise control information where the content is designed to be played when the industrial process is run through a defined set of phases, for example. In this case, the control information may affect the execution of the computer program accordingly to enable correct use of the computer program and prevent potentially dangerous errors. For example, functionalities such as user interface elements may be disabled or enabled in accordance with the control information.

Another example of a case where affecting execution of a computer program in user device 110 may be desirable is a game. Where user device 110 runs a game and the user simultaneously watches a television program, the game experience may be enhanced by providing a modified game experience based on control information user device 110 gleans from the television program, for example from information encoded in an audio part of the television broadcast, via microphone 116. As described above, the information may be encoded therein in a way that is inaudible, or nearly so, to humans. Such encoding may employ frequency elements, audio fingerprinting techniques or steganography, for example. In at least some embodiments, a bit rate of the control information need not be very high.

As a first example, in case the user plays a car racing game in his home, the car racing game may be configured to react to control information embedded in an automobile commercial on the television. At least one the following may then occur: 1) the logo of the advertising automobile manufacturer may be displayed on-screen in the car game, 2) the user may receive a bonus fill-up to his petrol tank in-game, and 3) an extra level may be revealed for the user to play.

As a second example, where the user plays a game manufactured by a game manufacturer, such as for example Rovio Entertainment of Espoo, Finland. Responsive to gleaning control information from a television program where the game manufacturer, the game or other games of the game manufacturer is featured, extra features of the game may be enabled in the game. A logo of the game manufacturer may additionally or alternatively be displayed, or caused to be displayed.

As a third example, a game experience may be enhanced where a pre-recorded motion picture has product placements. When the products are on-screen, control information may be emitted, for example embedded in the audio content of the motion picture. Such control information may unlock in the game products similar to those visible in the motion picture. Receiving information at the same, or nearly the same, time from two sources enhances the perceptibility of the information and may delight the user.

As a fourth example, responsive to a certain song being played in the radio, an advertisement associated with the song may be presented on a user's mobile phone. The advertisement may be associated with the song, for example, if the singer of the song is featured in the advertisement. In this case the song may comprise the control information. For example, responsive to a singer popular with young women singing a hit song, a mobile device may display to a user an advertisement where the singer says how fantastic a certain mascara is.

The control information may be specific to the computer program, to a manufacturer of the computer program, to a type of the computer program, and/or to a set of computer programs wherein the computer program is comprised. To achieve this, the control information may comprise at least one of an identifier of the computer program, an identifier of a manufacturer of the computer program, an identifier of a type of the computer program and an identifier associated with a set of computer programs, the computer program being comprised in the set of computer programs. In general, determining the control information conforms to a criterion defined by the computer program may comprise determining whether the computer program stores or is associated with such an identifier.

Where the control information is specific to the computer program, type of computer program, set of computer programs or manufacturer of computer program, a benefit is obtained wherein the control information needn't be specific to the content the control information is embedded in. For example where the content is played from a stored source, user device 110 needn't have access to any database of contents to determine whether it should react to the control information by modifying the execution of the computer program. Rather, user device 110 need only know which programs it is running, and optionally the type, manufacturer and/or set of at least one of the programs.

In some embodiments, user device 110 may be configured to both run the computer program and to play the content the control information is embedded in. In these cases, user device 110 may determine presence of the control information via microphone 116, or directly from a data file or data stream carrying the content. When the control information is determined directly from the data file or data stream, the audio may be played without the control information. A first example of this kind of embodiment is where a user uses a tablet computer to run an industrial process through a startup procedure. A sound file on the tablet computer may comprise verbal instructions and warnings to guide the user, the sound file also comprising control information to synchronously enable and/or disable features of the computer program the user uses to control the startup procedure. Alternatively, such sound file may be streamed to the tablet computer, for example via data interface 118. For example, a certain user interface option may only be available in connection with a verbal warning from the audio file, to increase process safety. A second example is where a user uses a smartphone to play a game, while listening to music stored on the smartphone in mp3 format or received streamed in digital format via data interface 118. Features in the game may be modified in response to control information in the mp3 files or in the incoming data stream.

In some embodiments, user device 110 may comprise or be enabled to interface to an accessory device, which may comprise, for example, a microphone unit capable of determining presence of control information. Such an accessory may be useful in case microphone 116 of user device 110 is unable to discern the control information, which may be encoded in a way that makes it inaudible to a human ear. In case microphone 116 is designed to mimic the capabilities of the human ear, it may be unable to pick up the control information and an accessory microphone may be needed to determine the presence and contents of the control information.

Figure 3:
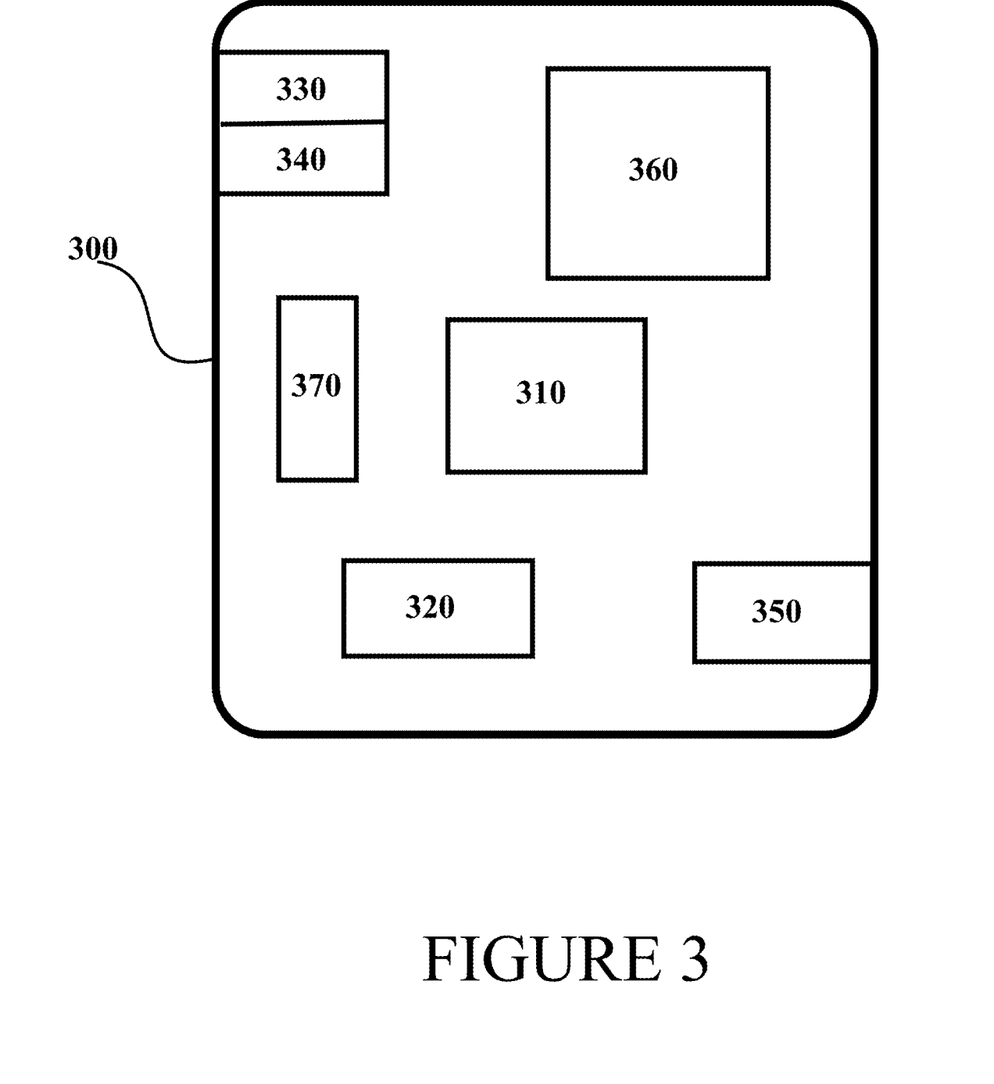
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a user device 110 of FIG. 1. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example. Transmitter 330 and/or receiver 340 may comprise data interface 118, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone, such as microphone 116 of FIG. 1. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
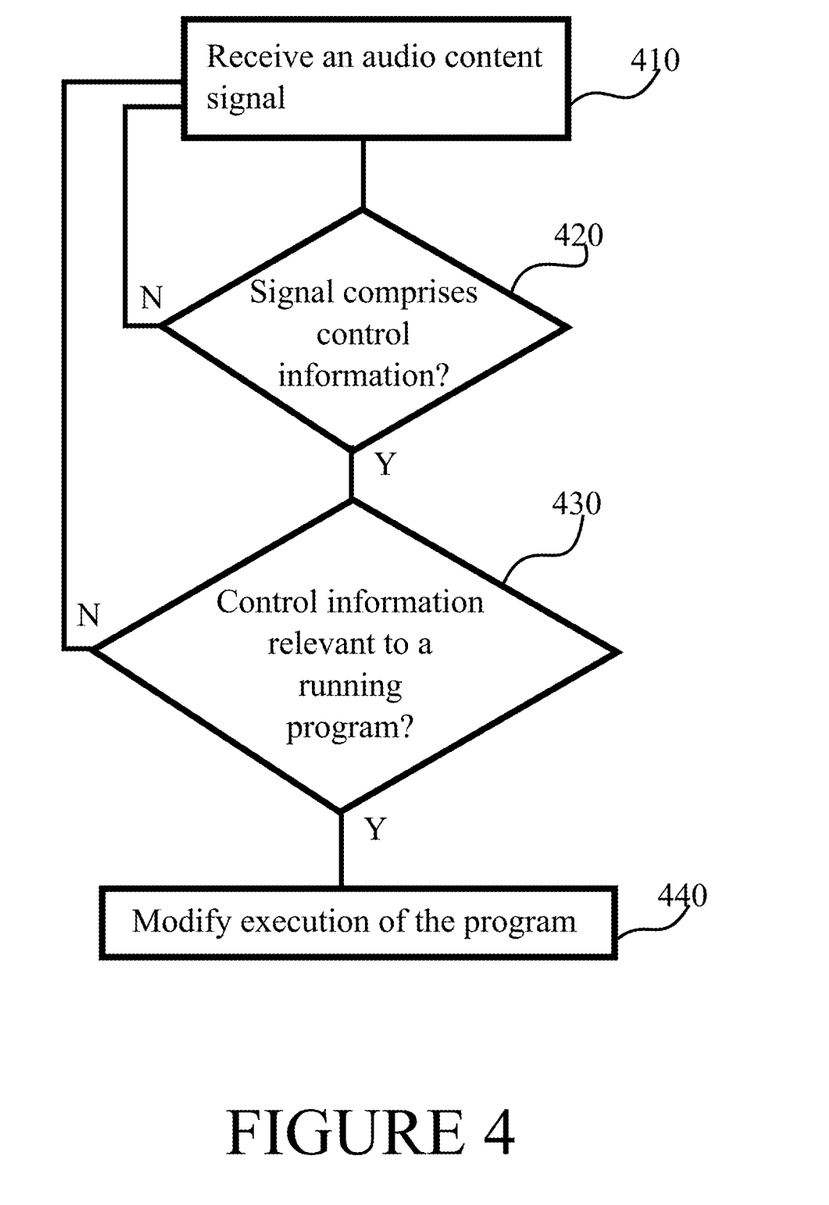
FIG. 4 is a graph of an example embodiment of the invention.

FIG. 4 is a graph of an example embodiment of the invention. Phase 410 of FIG. 4 comprises receiving an audio content signal, for example via a microphone or data interface comprised in an apparatus performing the phases of the illustrated method. From phase 410 processing advances to phase 420, wherein it is determined, if the received audio content signal comprises control information, for example encoded suitably in the audio content signal.

In case it is determined in phase 420 that control information is comprised in the received audio content signal, processing advances from phase 420 to phase 430. Otherwise, processing returns from phase 420 back to phase 410.

In phase 430, it is determined whether the control information relates to a program that is being run. In case it is determined in phase 430 that the control information relates to a program that is being run, processing advances from phase 430 to phase 440. Otherwise, processing returns from phase 430 back to phase 410.

In phase 440, execution of the program the control information relates to is modified, at least in part based on and/or responsive to the control information.

Figure 5:
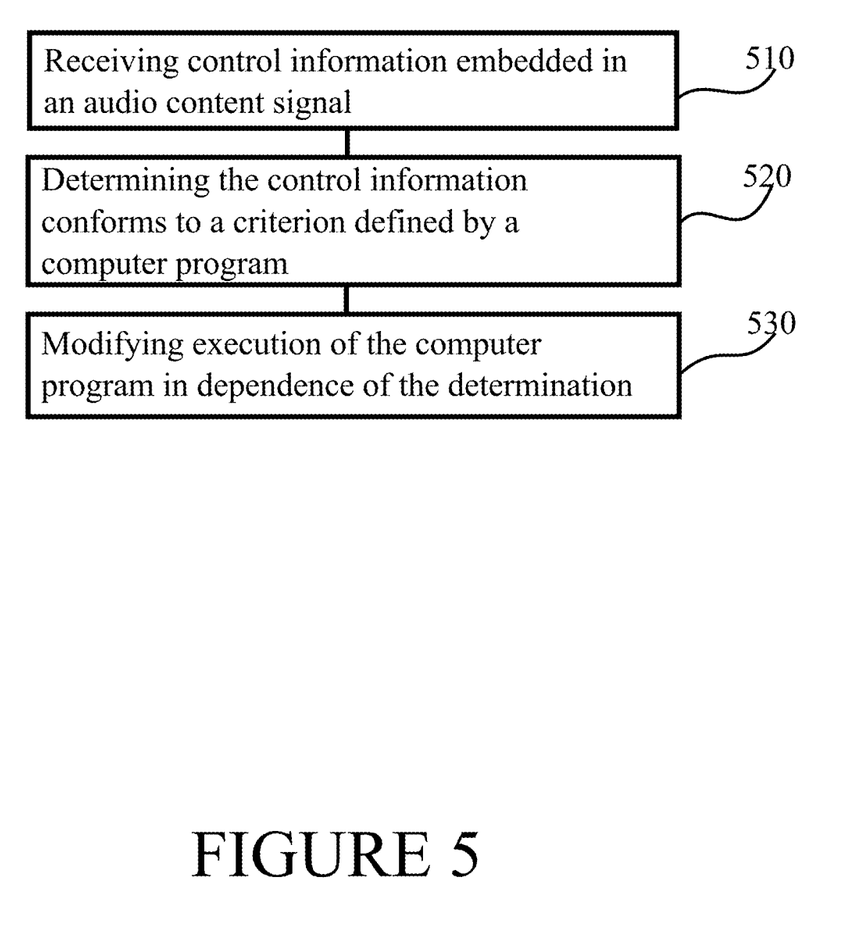
FIG. 5 is a first flow graph of a first method in accordance with at least some embodiments of the present invention.

FIG. 5 is a first flow graph of a first method in accordance with at least some embodiments of the present invention. The phases of the illustrated method may be performed in user device 110, for example. Phase 510 comprises receiving control information embedded in an audio content signal. Phase 520 comprises determining the control information conforms to a criterion defined by a computer program. Finally, phase 530 comprises modifying execution of the computer program at least in part in dependence of the determination.

Figure 6:
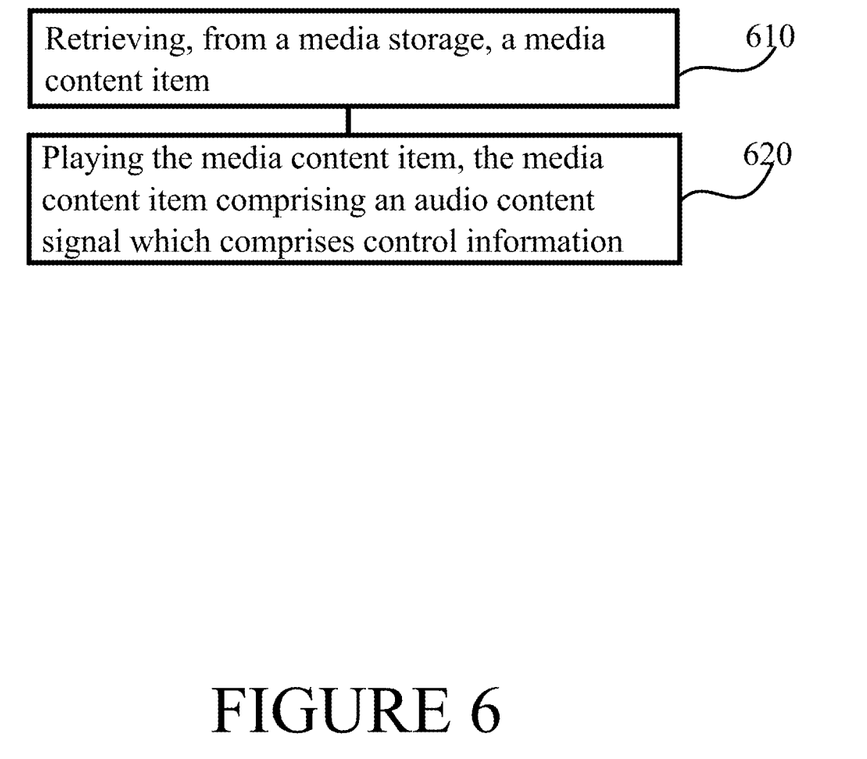
FIG. 6 is a second flow graph of a second method in accordance with at least some embodiments of the present invention.

FIG. 6 is a second flow graph of a second method in accordance with at least some embodiments of the present invention. The phases of the illustrated method may be performed in player of pre-recorded media 222, for example. Phase 610 comprises retrieving, from a media storage, a media content item. Phase 620 comprises playing the media content item, the media content item comprising an audio content signal which comprises, embedded therein, control information.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
at least one processing core;
at least one memory including a computer program,
wherein the at least one memory and the computer program code being configured to, with the at least one processing core, cause the apparatus at least to:
execute the computer program at a user device;
capture at the user device, by a microphone, while the computer program is executed, an audio content signal comprising control information embedded therein;
decode, by a decoder, the audio content signal to detect the control information embedded therein;
recognize at the user device that the control information meets a criterion, wherein the criterion is defined by the computer program itself, and wherein recognizing that the control information meets a criterion comprises determining whether the computer program stores or is associated with an identifier included in the control information;
modify execution of the computer program run at the user device when the control information meets the criterion, wherein the modifying execution of the computer program comprises modifying a set of available functionalities within the computer program, and wherein the modifying execution of the computer program is triggered by the control information embedded in the audio content signal captured by the microphone, the audio content signal being external to the user device and linked to the control information; and
display the modified execution of the computer program on a screen of the user device.

2. The apparatus of claim 1, wherein the control information does not identify a media content item in which the audio content signal is comprised.

3. The apparatus of claim 1, wherein the modifying of the set of available functionalities in the computer program comprises at least one of adding and removing menu options from a user interface of the computer program.

4. The apparatus of claim 1, wherein the modifying of the set of available functionalities in the computer program comprises at least one of enabling and disabling aspects of the computer program.

5. The apparatus of claim 1, wherein the computer program comprises a game and the modifying of the set of available functionalities in the computer program comprises at least one of allowing access to a bonus level, allowing use of a bonus item, recharging a player entity in the game and allowing use of a bonus vehicle.

6. The apparatus according to claim 1, wherein the recognizing that the control information meets the criterion defined by the computer program comprises recognizing that the control information comprises at least one of an identifier of the computer program, an identifier of a manufacturer of the computer program, an identifier of a type of the computer program and an identifier associated with a set of computer programs, wherein the computer program is comprised in the set of computer programs.

7. The apparatus according to claim 1, wherein the recognizing that the control information meets the criterion defined by the computer program comprises verifying that the control information comprises a valid cryptographic token.

8. The apparatus according to claim 7, wherein the cryptographic token comprises a cryptographic signature.

9. A method, comprising:
executing a computer program at a user device;
capturing at the user device, by a microphone, while the computer program is executed, an audio content signal comprising control information embedded therein;
decoding, by a decoder, the audio content signal to detect the control information embedded therein;
recognizing at the user device that the control information meets a criterion, wherein the criterion is defined by the computer program itself, and wherein recognizing that the control information meets a criterion comprises determining whether the computer program stores or is associated with an identifier included in the control information;
modifying execution of the computer program run at the user device when the control information meets the criterion, wherein the modifying execution of the computer program comprises modifying a set of available functionalities within the computer program, and wherein the modifying execution of the computer program is triggered by the control information embedded in the audio content signal captured by the microphone, the audio content signal being external to the user device and linked to the control information; and
displaying the modified execution of the computer program on a screen of the user device.

10. The method of claim 9, wherein the control information does not identify a media content item in which the audio content signal is comprised.

11. The method of claim 9, wherein the modifying of the set of available functionalities in the computer program comprises at least one of adding and removing menu options from a user interface of the computer program.

12. The method of claim 9, wherein the modifying of the set of available functionalities in the computer program comprises at least one of enabling and disabling aspects of the computer program.

13. The method of claim 9, wherein the computer program comprises a game and the modifying of the set of available functionalities in the computer program comprises at least one of allowing access to a bonus level, allowing use of a bonus item, recharging a player entity in the game and allowing use of a bonus vehicle.

14. The method according to claim 9, wherein the recognizing that the control information meets the criterion defined by the computer program comprises recognizing that the control information comprises at least one of an identifier of the computer program, an identifier of a manufacturer of the computer program, an identifier of a type of the computer program and an identifier associated with a set of computer programs, wherein the computer program is comprised in the set of computer programs.

15. The method according to claim 9, wherein the recognizing that the control information meets the criterion defined by the computer program comprises verifying that the control information comprises a valid cryptographic token.

16. The method according to claim 15, wherein the cryptographic token comprises a cryptographic signature.

17. A non-transitory computer readable medium having stored thereon a set of computer readable instructions that, when executed by at least one processor, cause an apparatus to at least:
execute a computer program at a user device;
capture at the user device by a microphone, while the computer program is executed, an audio content signal comprising control information embedded therein;
decode, by a decoder, the audio content signal to detect the control information embedded therein;
recognize at the user device that the control information meets a criterion, wherein the criterion is defined by the computer program itself, and wherein recognizing that the control information meets a criterion comprises determining whether the computer program stores or is associated with an identifier included in the control information;
modify execution of the computer program run at the user device when the control information meets the criterion, wherein the modifying execution of the computer program comprises modifying a set of available functionalities within the computer program, and wherein the modifying execution of the computer program is triggered by the control information embedded in the audio content signal captured by the microphone, the audio content signal being external to the user device and linked to the control information; and
display the modified execution of the computer program on a screen of the user device.

* * * * *